(12) United States Patent
Dolesh et al.

(10) Patent No.: US 10,543,839 B2
(45) Date of Patent: Jan. 28, 2020

(54) LOW SPEED CRUISE CONTROL FOR A VEHICLE

(71) Applicant: Shem, LLC, Hagerstown, IN (US)

(72) Inventors: William L. Dolesh, Richmond, IN (US); Eric Amback, Greenfield, WI (US); Gerhard Engelbrecht, New Castle, IN (US); Christopher Rood, Greenfield, IN (US)

(73) Assignee: Shem, LLC, Hagerstown, IN (US)

( * ) Notice: Subject to any disclaimer, the term of this patent is extended or adjusted under 35 U.S.C. 154(b) by 0 days.

(21) Appl. No.: 14/864,104

(22) Filed: Sep. 24, 2015

(65) Prior Publication Data

US 2016/0082962 A1 Mar. 24, 2016

Related U.S. Application Data

(60) Provisional application No. 62/054,684, filed on Sep. 24, 2014.

(51) Int. Cl.
*B60W 30/14* (2006.01)

(52) U.S. Cl.
CPC ................. *B60W 30/143* (2013.01)

(58) Field of Classification Search
CPC .......... B60W 30/143; B60W 2300/12; B60W 2510/0638; B60K 31/047; Y02T 10/52
See application file for complete search history.

(56) References Cited

U.S. PATENT DOCUMENTS

| 3,773,304 | A | * | 11/1973 | Hodgson | B28C 5/422 366/44 |
| 4,286,685 | A | * | 9/1981 | Rudolph | B60K 31/105 123/353 |
| 4,523,564 | A | * | 6/1985 | Sturdy | B60K 31/047 123/352 |
| 4,826,107 | A | * | 5/1989 | Thornton-Trump | B64F 5/23 122/408.1 |
| 5,393,277 | A | * | 2/1995 | White | B60K 31/047 477/108 |

(Continued)

FOREIGN PATENT DOCUMENTS

| JP | 2006342840 A | 12/2006 |
| JP | 2007269122 A | 10/2007 |

(Continued)

*Primary Examiner* — Sze-Hon Kong
(74) *Attorney, Agent, or Firm* — Banner & Witcoff, Ltd.

(57) ABSTRACT

A cruise control system for a vehicle having an engine and a power take-off throttle control capable of controlling the speed of the engine includes a cruise control device in communication with a speedometer of the vehicle and the power take-off throttle control. The cruise control device includes a processor configured for receiving a user selection of a set ground speed, determining a current ground speed of the vehicle, via communication with the speedometer, comparing the current ground speed with the set ground speed, and taking further action to maintain the current ground speed close to the set ground speed. The further action taken by the processor may include transmitting an acceleration signal or deceleration signal to the power take-off throttle control to increase or decrease a speed of the engine if the current ground speed is determined to be lower or higher than the set ground speed.

23 Claims, 6 Drawing Sheets

(56) References Cited

U.S. PATENT DOCUMENTS

| | | | | |
|---|---|---|---|---|
| 5,570,754 A * | 11/1996 | Stimson | ............... | A01B 51/026 180/167 |
| 5,847,470 A * | 12/1998 | Mitchell | ................. | B60K 6/00 180/65.23 |
| 5,971,888 A | 10/1999 | Goode | | |
| 6,138,069 A | 10/2000 | Ellertson et al. | | |
| 6,470,256 B1 * | 10/2002 | Cikalo | ................... | B60K 31/04 123/350 |
| 6,553,302 B2 | 4/2003 | Goodnight et al. | | |
| 6,571,168 B1 * | 5/2003 | Murphy | ................. | G07C 5/085 340/438 |
| 7,150,497 B1 * | 12/2006 | Smith | ..................... | B66C 13/54 296/190.01 |
| 7,181,328 B2 | 2/2007 | Berglund et al. | | |
| 7,331,901 B2 | 2/2008 | Busch | | |
| 7,472,684 B1 * | 1/2009 | McKee | .................. | B60K 31/00 123/352 |
| 8,185,278 B2 * | 5/2012 | Price | ................... | F02D 41/0205 123/396 |
| 8,758,016 B1 * | 6/2014 | Henriksson | ............ | G09B 19/16 434/29 |
| 2003/0024998 A1 * | 2/2003 | Pierce | ................ | E01C 19/203 239/172 |
| 2003/0222770 A1 * | 12/2003 | Lesesky | ................ | G07C 5/008 340/431 |
| 2007/0078041 A1 * | 4/2007 | Nishi | .................... | F16H 61/423 477/115 |
| 2007/0207711 A1 * | 9/2007 | Crocker | ................. | E01H 1/103 451/67 |
| 2008/0173113 A1 | 7/2008 | Van Schothorst | | |
| 2008/0183358 A1 * | 7/2008 | Thomson | ............... | B60W 10/06 701/54 |
| 2009/0254259 A1 * | 10/2009 | The | ................... | B60K 31/0058 701/70 |
| 2009/0299613 A1 * | 12/2009 | Nishi | ................... | B60W 10/06 701/110 |
| 2010/0192907 A1 * | 8/2010 | Stemler | ................... | F02D 29/02 123/350 |
| 2011/0178684 A1 * | 7/2011 | Umemoto | ............. | F16H 61/421 701/51 |
| 2011/0238272 A1 * | 9/2011 | Kato | ..................... | B60W 10/06 701/55 |
| 2011/0246042 A1 * | 10/2011 | Tomokuni | .......... | B60W 30/143 701/93 |
| 2012/0253628 A1 * | 10/2012 | Maruyama | .......... | B60W 50/085 701/93 |
| 2013/0030667 A1 * | 1/2013 | Fujimoto | .............. | B60W 10/06 701/93 |
| 2013/0345914 A1 * | 12/2013 | Love | .................... | B60K 31/047 701/22 |
| 2014/0195116 A1 * | 7/2014 | Hrovat | ................. | B60W 10/06 701/38 |
| 2014/0343818 A1 * | 11/2014 | Johansson | ............. | B60K 31/00 701/94 |
| 2015/0006055 A1 * | 1/2015 | Johansson | ......... | B60W 50/0097 701/93 |
| 2015/0066309 A1 * | 3/2015 | Porter | ................... | B60W 10/06 701/48 |
| 2015/0151747 A1 * | 6/2015 | Fairgrieve | ................ | B60T 7/22 701/91 |
| 2015/0165905 A1 * | 6/2015 | Filev | ..................... | B60K 31/00 701/94 |
| 2015/0191170 A1 * | 7/2015 | Johansson | ............. | B60K 31/00 701/94 |
| 2015/0217766 A1 * | 8/2015 | Kelly | ................... | F16H 61/0213 701/94 |
| 2015/0217767 A1 * | 8/2015 | Kelly | .................... | B60K 28/16 701/93 |
| 2015/0321670 A1 * | 11/2015 | Johansson | ......... | B60W 50/0097 701/94 |
| 2015/0329113 A1 * | 11/2015 | Carlsson | ............. | B60W 30/143 701/93 |
| 2015/0367849 A1 * | 12/2015 | Kvist | .................... | E02F 9/2079 701/93 |
| 2016/0046287 A1 * | 2/2016 | Owen | ................. | B60W 50/082 701/43 |
| 2016/0214608 A1 * | 7/2016 | Packwood-Ace | ..... | B60W 30/14 |

FOREIGN PATENT DOCUMENTS

| | | |
|---|---|---|
| JP | 2008190382 A | 8/2008 |
| WO | 2009022968 A1 | 2/2009 |

\* cited by examiner

LOW SPEED CRUISE CONTROL FOR A VEHICLE

CROSS-REFERENCE TO RELATED APPLICATION

This application claims priority to, and is a non-provisional of, U.S. Provisional Application No. 62/054,684, filed Sep. 24, 2014, which prior application is incorporated by reference herein in its entirety and made part hereof.

TECHNICAL FIELD

The present invention generally relates to a cruise control system for a vehicle and, in some more specific embodiments, to a cruise control system that controls the engine RPM through a power take-off function of the engine, in order to maintain the vehicle at a constant speed.

BACKGROUND

Trucks and other vehicles often include cruise control systems, which are designed to control the operation of the engine to maintain a desired constant ground speed. Most cruise control systems are designed for operation at typical travelling speeds (e.g., greater than 30 mph), to make driving long distances more comfortable and less demanding for the operator. Such cruise control systems may not operate consistently or effectively at low vehicle speeds (e.g., 30 mph or less). Certain working vehicles require travel at a constant low vehicle speed, such as road striping vehicles, where constant speeds help ensure even application of paint. Such vehicles typically achieve constant speed control by manually setting the engine at a specific RPM. However, this technique can result in unacceptable speed variations when the vehicle travels on inclines or declines, where increases or decreases in engine RPM may be necessary to maintain a constant speed. Another technique for low speed cruise control in such vehicles is through the use of a separate motor, such as a hydraulic drive motor, to drive the wheels at the set speed. This configuration may not be usable without the installation of additional components to the vehicle, increasing the cost and complexity of manufacture and operation.

Thus, while certain vehicles and cruise control systems for such vehicles according to existing designs provide a number of advantageous features, they nevertheless have certain limitations. The present invention seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the present disclosure relate to a cruise control system for a vehicle having an engine and a power take-off throttle control capable of controlling the speed of the engine, or a vehicle that includes such a cruise control system. The vehicle may include typical components such as a chassis supported by a plurality of wheels, with the engine operably coupled to supply power to at least one of the wheels, and with the engine having a main throttle configured to be controlled by the operator to control the speed of the engine. The cruise control system may include a cruise control device in communication with a speedometer of the vehicle and the power take-off throttle control, wherein the cruise control device comprises a processor configured for performing various tasks. In one example, the processor is configured for receiving a user selection of a set ground speed, determining a current ground speed of the vehicle, via communication with the speedometer, comparing the current ground speed with the set ground speed, and taking further action based on the comparison between the current ground speed and the set ground speed, in order to maintain the current ground speed close to the set ground speed. The further action taken by the processor may include transmitting an acceleration signal or deceleration signal to the power take-off throttle control to increase or decrease a speed of the engine if the current ground speed is determined to be lower or higher than the set ground speed.

According to one aspect, the processor of the cruise control device is configured for utilizing a threshold in determining whether the current ground speed is higher or lower than the set ground speed. The threshold may be a set value or may depend on the set ground speed, such as a percentage of the set ground speed, in various examples.

According to another aspect, the processor of the cruise control device is further configured for determining a pulse time of the power take-off throttle control for increasing or decreasing the engine speed to maintain the set ground speed, and the acceleration signal or the deceleration signal transmitted to the power take-off throttle control includes the pulse time. The pulse time may be determined at least partially based on one or more factors selected from a group consisting of the set ground speed, a loading of the vehicle, and a degree of deviation from the set ground speed, etc.

According to a further aspect, the processor of the cruise control device is further configured for utilizing a response time, such that the processor is configured for transmitting the acceleration signal or the deceleration signal to the power take-off throttle control to increase or decrease a speed of the engine if the current ground speed is determined to be lower or higher than the set ground speed for a time exceeding the response time. The processor of the cruise control device may also be configured such that the response time varies based on operating conditions of the vehicle. For example, the operating conditions of the vehicle that influence the response time include at least one of a loading condition of the vehicle and the set ground speed. Additionally, the processor of the cruise control device may be configured for calculating the response time based on the operating conditions of the vehicle.

According to yet another aspect, the vehicle may include a main throttle configured to be controlled by the operator to control the speed of the engine, and the power take-off throttle is further configured for overriding the main throttle of the engine when the cruise control is activated.

According to a still further aspect, the vehicle includes an interface configured to receive user input for controlling the cruise control system. The interface may be within an operator cab that is supported by the chassis, or may be located outside the operator cab, such as in an operator area of a body that is supported by the chassis. The vehicle may include multiple interfaces in some configurations.

Additional aspects of the present disclosure relate to a cruise control system for a vehicle having an engine and a power take-off throttle control capable of controlling the speed of the engine, or a vehicle that includes such a cruise control system. The vehicle may include typical components such as a chassis supported by a plurality of wheels, with the engine operably coupled to supply power to at least one of the wheels, and with the engine having a main throttle configured to be controlled by the operator to control the speed of the engine. The cruise control system may include a cruise control device in communication with a speedometer of the vehicle and the power take-off throttle control, where the cruise control device includes a processor configured for transmitting instructions to the power take-off throttle control for maintaining a current ground speed of the vehicle close to a set ground speed selected by a user. The power take-off throttle control is configured for overriding the main throttle when the cruise control is activated. The cruise control system and/or the vehicle provided with such a system may include any of the features and aspects described above.

Further aspects of the present disclosure relate to a cruise control system for a vehicle having an engine and a power take-off throttle control capable of controlling the speed of the engine, or a vehicle that includes such a cruise control system. The vehicle may include typical components such as a chassis supported by a plurality of wheels, with the engine operably coupled to supply power to at least one of the wheels, and with the engine having a main throttle configured to be controlled by the operator to control the speed of the engine. The vehicle may also have an operator cab supported by the chassis and a body supported by the chassis and having an operator area thereon, located outside the operator cab of the vehicle. The cruise control system may include a cruise control device in communication with a speedometer of the vehicle and the power take-off throttle control, where the cruise control device includes a processor configured for transmitting instructions to the power take-off throttle control for maintaining a current ground speed of the vehicle close to a set ground speed selected by a user. An interface may be provided to be accessible from the operator area of the body and configured to receive user input for controlling the cruise control system. The cruise control system and/or the vehicle provided with such a system may include any of the features and aspects described above.

Other features and advantages of the disclosure will be apparent from the following description taken in conjunction with the attached drawings.

BRIEF DESCRIPTION OF THE DRAWINGS

To understand the present invention, it will now be described by way of example, with reference to the accompanying drawings in which.

It is understood that certain components may be removed from the drawing figures in order to provide better views of internal components.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Figure 1:
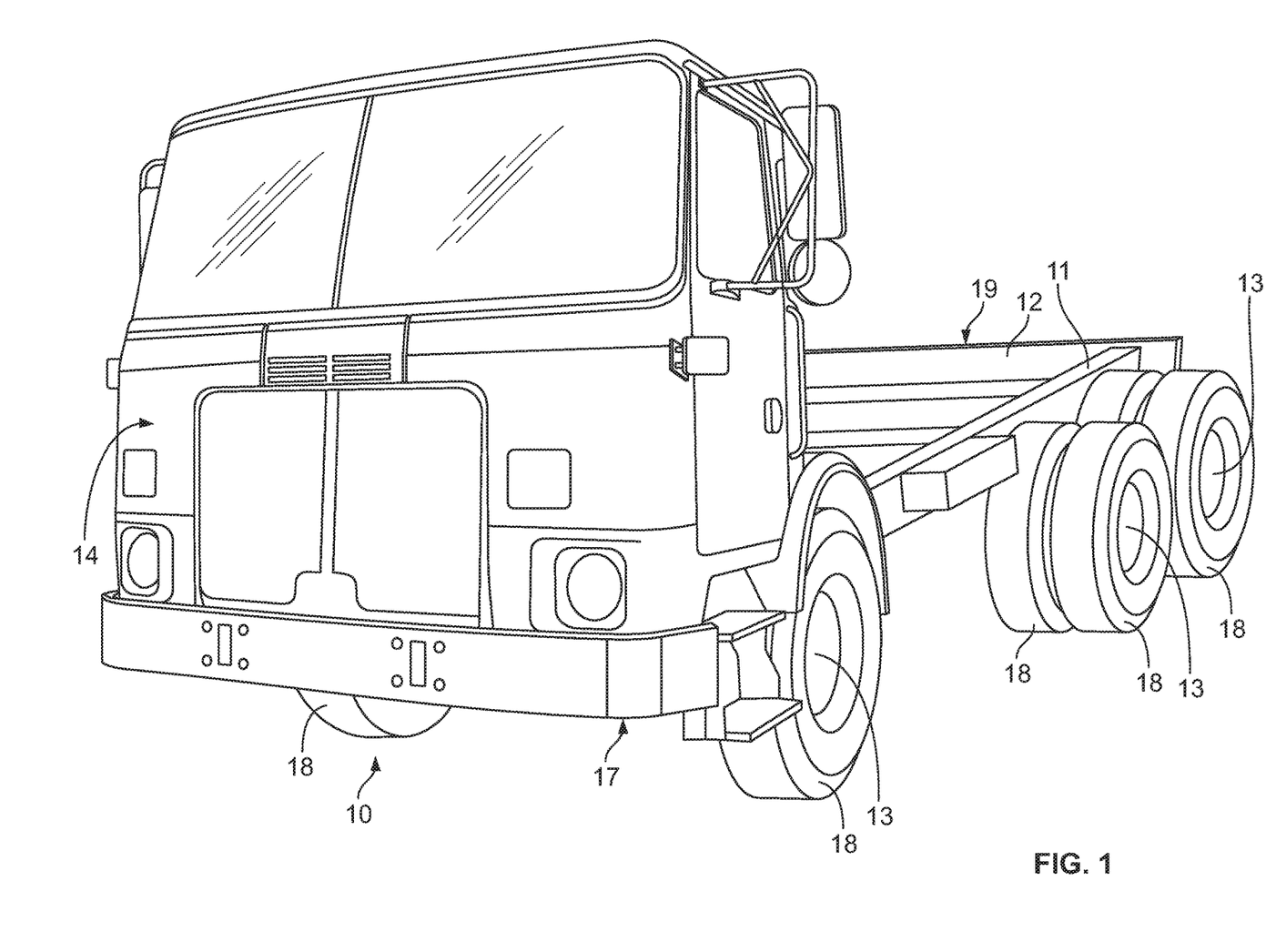
FIG. 1 is a perspective view of one embodiment of a vehicle according to aspects of the present disclosure.
Figure 2:
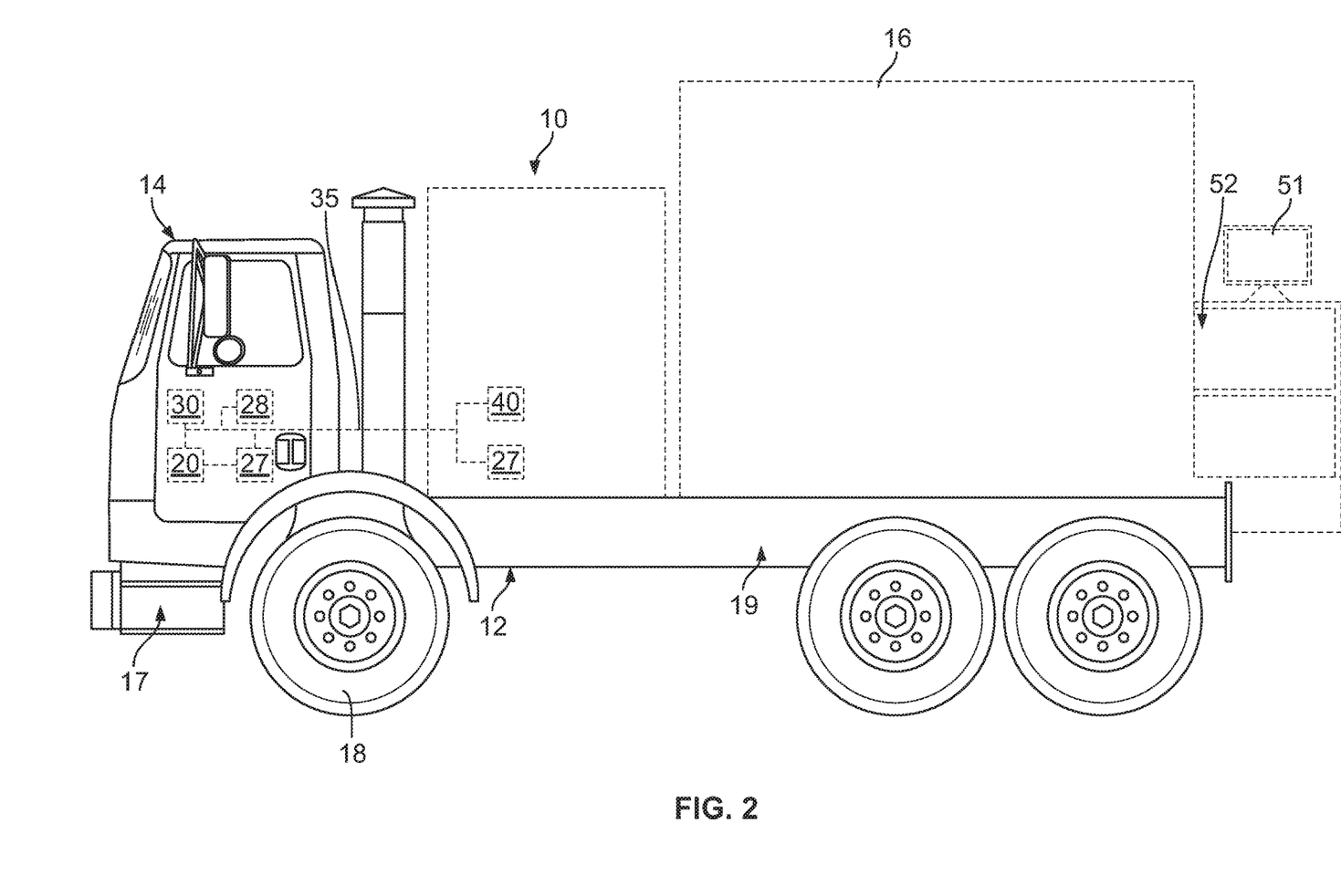
FIG. 2 is a side view of the vehicle of FIG. 1, with a body connected to the vehicle shown schematically in broken lines, in the form of a road striping truck.

Referring now in detail to the Figures, FIGS. 1-2 illustrate a vehicle that may be used in accordance with aspects of the present invention, generally designated with the reference numeral 10. In one embodiment, the vehicle 10 is in the form of a road striping truck, configured for applying paint lines to a road or other surface. It is understood that aspects and features of the present invention can be incorporated into various types of vehicles, including other heavy-duty vehicles, medium-duty vehicles or light vehicles of various applications.

The vehicle 10 as shown in FIGS. 1-2 generally includes a chassis 12 supporting an operator cab 14 and a vehicle body 16. When assembled, the body 16 and the operator cab 14 are mounted on the chassis 12. The chassis 12 is a truck chassis and may have frame members or rail members 11, and the chassis 12 has a front portion 17 for supporting the operator cab 14 and a rear portion 19 for supporting the body 16. In one embodiment, the rail members 11 are made from steel and are generally rectangular in cross-section (e.g., a C-section). The rail members 11 may extend substantially the entire length of the chassis 12 in one embodiment, and may serve as points of support and/or connection for the body 16, the cab 14, the axles 13, and other components. As is known in the art, the chassis 12 has a front axle 13 and one or more rear axles 13 which in turn are attached to wheels 18 for movement of the chassis 12 along a surface. Additionally, as shown schematically in FIG. 2, the vehicle 10 includes a drivetrain that includes an engine 20 connected to a transmission (not shown) configured to transfer power to at least one of the wheels 18. The transmission may be connected to one or both rear wheels 18 in one embodiment, but it is understood that the transmission may be connected to transfer power directly to any number of the wheels 18, including, additionally or alternately, one or more of the front wheels 18 in some embodiments. It is understood that the transmission may allow shifting between several settings (e.g. D, N, R) and several gears (e.g. various forward-drive gear ratios). The engine 20 may have a main throttle 29 that controls the speed (i.e., RPM) of the engine 20, which may be connected to a manual actuator (not shown), e.g., a gas pedal or a throttle lever. Additional components connected to the engine 20 may be included as well, including an exhaust pipe, an air cleaner assembly, etc. The vehicle 10 further contains a power take-off (PTO) 21, which is a programmable component and function of the engine 20 in the embodiment illustrated in FIGS. 1-5. Accordingly, when used in connection with the example embodiments shown in FIGS. 1-5 and described herein, the term "PTO 21" refers to a PTO component and function of the engine 20. It is understood that in other embodiments within the scope of this disclosure, the vehicle 10 may include a PTO that includes components configured for providing a power output from the engine 20 that can be used to power various implements. The PTO 21 may have various controls, such as an associated throttle control 27 that can be used to control the speed (i.e., RPM) of the engine 20, and can override the main throttle 29. The throttle control 27 may include a manually activatable actuator (not shown) in one embodiment that is separate from the actuator for the main throttle 29. The actuator for the PTO throttle control 27 may be a mechanical actuator, such as a lever, button, switch, etc., and/or may be activated on an interface (e.g., via a button, switch, touchscreen, voice command, etc.), such as the interfaces 50, 51 described elsewhere herein. The vehicle 10 may further include components as known in the art. It is understood that the components in FIG. 2 are illustrated schematically, and may have sizes and/or locations that are different from those shown.

The chassis 12 may receive several different configurations of the body 16, having various functionalities. As illustrated in FIG. 2, in an exemplary embodiment for a road striping truck, the body 16 includes components such as paint storage tanks, pressure tanks or other pressure systems, sprayers or other paint application devices, one or more operator areas, etc. These components are not illustrated in detail, as the body 16 in FIG. 2 is illustrated schematically. It is understood that the body 16 may include additional or different components in other embodiments. Additionally, the vehicle 10 may be outfitted with a number of different types of bodies 16, which may have many different functionalities. For example, other types of vehicles for which the features described herein may be particularly useful include vacuum trucks, x-ray trucks, street sweepers, high-pressure wash units, street patcher trucks and road grinders, which may include bodies 16 and/or other components with specialized functionality.

Figure 3:
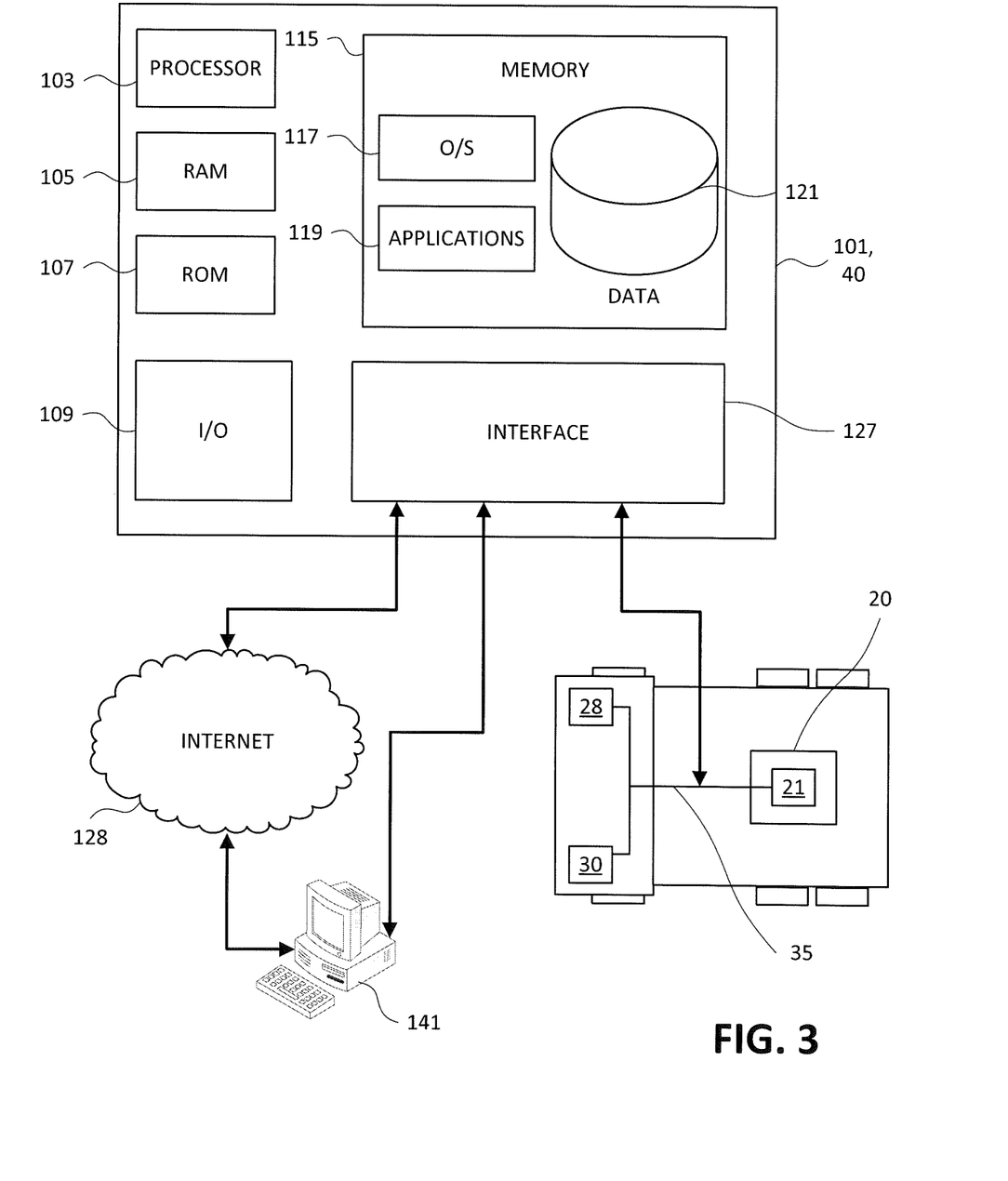
FIG. 3 is a schematic diagram showing one embodiment of a cruise control system or other electronic device in communication with a vehicle control system according to aspects of the present disclosure.
Figure 4:
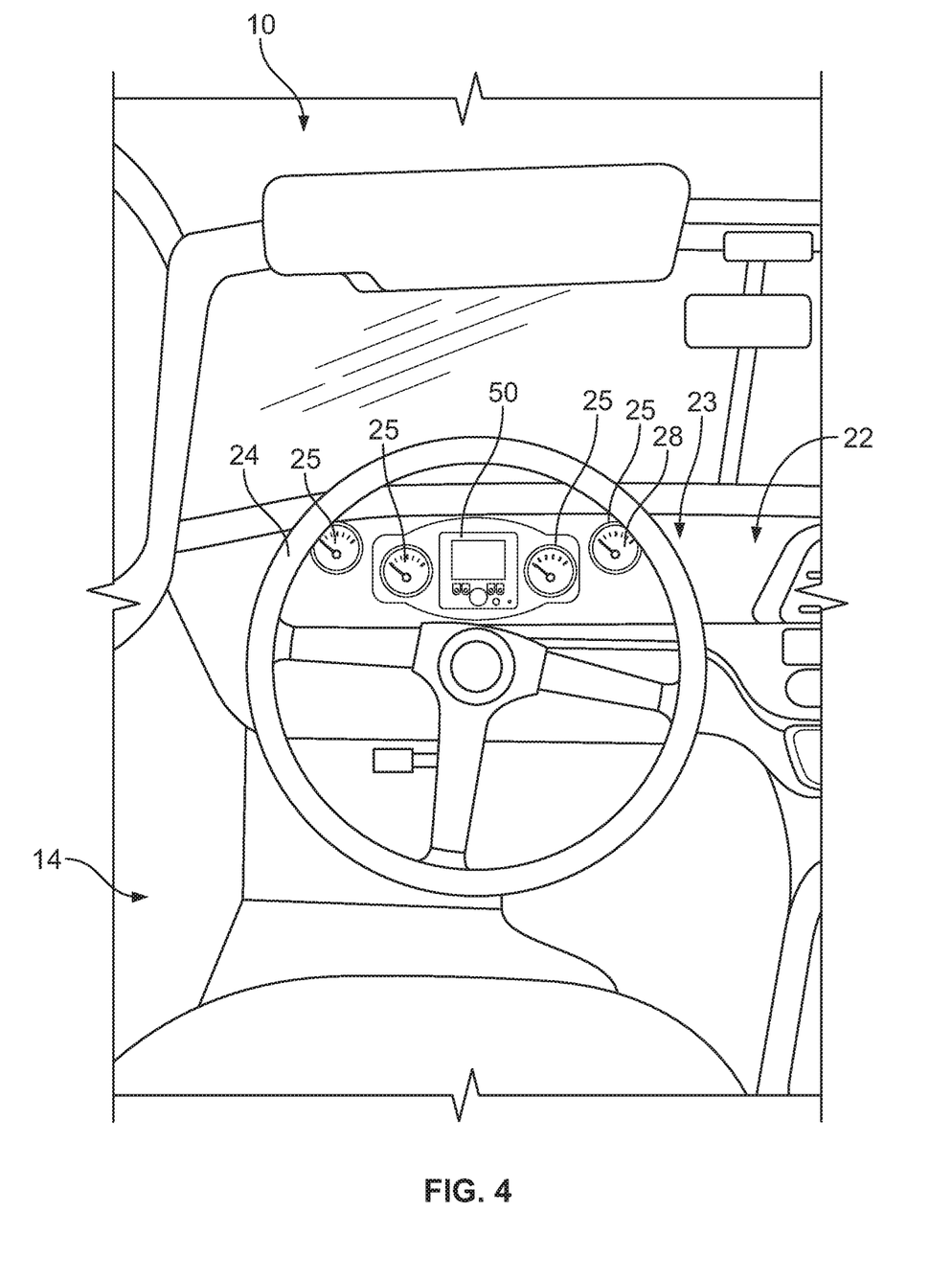
FIG. 4 is a plan view of an operator cab of the vehicle of FIG. 1, showing a dashboard of the vehicle with a display on the dashboard.

The operator cab 14 generally includes passenger area, which in the embodiment of FIGS. 1-4, includes both a left area and a right area. The vehicle 10 may be operable in a left and/or right hand drive configuration, and may be switchable between such configurations, and the left and right areas may be configured for one or more operators or passengers, depending on the drive configuration. The operator cab 14 may also contain controls 22 for operating and monitoring the vehicle 10, some of which may be located on a dashboard 23, such as a steering wheel 24 and various gauges/meters 25, as shown in FIG. 4. The controls 22 may also include various switches, controls, displays, etc., including for example an ignition switch, a speedometer and/or other monitors, and a transmission control (e.g. a stick or a push-button control), which may be located on or in the dashboard 23 and/or a console separating the left and right areas of the cab 14. One such gauge/meter 25 may be a speedometer 28. It is understood that the speedometer 28 may include both a display device (e.g., the gauge/meter 25) and a computer component to measure the speed of the vehicle and control the output of the display, as described below. The controls 22 may further include actuators for a main or service braking system, which may be air brakes in one embodiment, a parking brake system, or a throttle (e.g., an accelerator), as well as controls for one or more components of the body 16. At least some of such controls 22 may be integrated into and/or controlled by a vehicle control system, as described herein.

The vehicle 10 generally includes a vehicle control system, which includes a primary vehicle controller 30 (see FIG. 3), as well as various controllers configured for controlling specific components of the vehicle 10. For example, in one embodiment, the vehicle control system may include an engine controller configured to control the engine 20, a transmission controller configured to control the transmission (not shown), and a brake controller configured to control the brake system (not shown) of the vehicle 10. In other embodiments, the control system may include additional or alternate controllers that are configured to control other components of the vehicle, such as fuel controls, body controls, lighting controls, a GPS data monitoring system, etc. The vehicle 10 may also include an internal communication network 35 that is generally in communication with the various components of the vehicle control system, including the various controllers, allowing the components of the control system to communicate with each other and with other systems via the network 35. The network 35 may be a J1939 databus network in one embodiment, and may be configured for wired and/or wireless data communication. The vehicle control system may also be connected to various instrumentation (e.g., the gauges 25), at least some of which may be visible and/or accessible from within the operator cab 14 for communicating information to the user, such as information regarding the operation of various vehicle systems and components. The vehicle control system may further include a user interface 50 positioned within the operator cab 14, which can allow the operator to control and/or monitor various components of the vehicle 10. The interface 50 may further be in communication with a vehicle diagnostic system that also communicates over the network 35.

The vehicle 10 may include a cruise control system 40, illustrated schematically in FIGS. 2-3. The cruise control 40 is configured to communicate with the speedometer 28 to determine the ground speed of the vehicle 10 and is further configured to communicate with the throttle control 27 of the PTO 21 to control the speed of the engine 20. Controlling the engine 20 speed through the PTO 21 (e.g., using the PTO throttle control 27) provides advantages over using the main throttle 29 of the engine 20, such as in an existing cruise control. For example, use of the PTO throttle control 27 is less complicated, and the PTO 21 has switches and/or programmable controls already available that can be used for this purpose, as described below with respect to FIG. 5. As another example, the PTO 21 is already configured for use at low speeds, and the controls of the PTO 21 can be used automatically from the engine 20. As stated above, the throttle control 27 of the PTO 21 can override the main throttle 29 of the engine 20. In one embodiment, the cruise control system 40 is configured such that the PTO throttle control 27 overrides the main throttle 29 of the engine 20 when switched on, and such that applying the brake and/or the main throttle 29 (e.g., by manual actuation) will override the control of the PTO 21. At that point, the cruise control system 40 will need to be set again in order to override the main throttle 29, such as by using the controls of the PTO 21.

The desired ground speed may be set by receiving a selection of the set ground speed from the operator or other user. Generally, the set speed is set while the vehicle 10 is moving at or near the set speed. In one embodiment, the set speed is set by the cruise control 40 setting the current ground speed of the vehicle 10 as the set speed. Thus, in this configuration, the operator brings the vehicle 10 to the set speed and then sets the cruise control 40. In another embodiment, the set speed may be specifically selected, regardless of the speed at which the vehicle 10 is traveling. The cruise control 40 may also have options for the operator to incrementally increase or decrease the selected ground speed. The cruise control 40 is configured to adjust the ground speed of the vehicle 10 to match the set speed. In one embodiment, the cruise control 40 adjusts the speed of the engine 20 using the controls (e.g., the throttle control 27) of the PTO 21 when the ground speed is determined to deviate from the set speed, i.e., by increasing the engine speed when the ground speed is determined to be too low, or decreasing the engine speed when the ground speed is determined to be too high. The cruise control 40 may operate using a threshold, where the engine speed is adjusted if the deviation from the set speed exceeds the threshold. This threshold may be, for example, an absolute speed difference or a percentage of the set speed, in various embodiments. Such a threshold may be +/−4% of the set speed in one embodiment. In one embodiment, the cruise control 40 is configured for use to maintain a constant ground speed (e.g., +/−0.5 mph) at speeds of up to 20 mph, or at speeds of up to 30 mph in another embodiment.

The cruise control 40 may communicate with other instruments in the vehicle 10, including various components of the vehicle control network, to read data and/or transmit instructions for operation. As one example, the cruise control 40 may read the vehicle speed from the speedometer 28. As another example, the cruise control 40 may detect whether the brake is being depressed from the brake control system. As another example, the cruise control 40 may transmit instructions to the PTO controls (e.g., the throttle control 27) to increase or decrease the engine speed. As a further example, the cruise control 40 may detect whether the PTO 21 has been enabled and/or set through communication with the PTO 21 and/or a controller that controls the PTO. It is understood that the cruise control 40 may also read such information or transmit such instructions to various components indirectly through the main vehicle controller 30.

The response time of the cruise control 40, i.e., how long a deviation from the set speed must exist before the cruise control 40 operates to adjust the engine speed, can influence how closely to the set speed the cruise control 40 can maintain the ground speed of the vehicle 10. Certain operating conditions may necessitate shorter response times to maintain constant speed to a desired accuracy, while other operating conditions may be more conducive to the use of longer response times, while still maintaining desired accuracy. Such operating conditions may include the loading condition of the vehicle 10 (i.e., whether the vehicle 10 is carrying a load and/or the weight of the load), the selected ground speed of the vehicle, and others. In one embodiment, the cruise control 40 may use different response times for different operating conditions. For example, in one embodiment, the cruise control 40 may utilize one response time for an "unloaded" condition and another response time for a "loaded" condition, which may be selectable by the user or automatically determined, e.g., by the vehicle controller 30. In such a configuration, the cruise control 40 may receive user input regarding the loading condition of the vehicle 10, such as an indication of a "loaded" or "unloaded" condition (e.g., through a button, toggle switch, touchscreen, or other input), and the cruise control then applies an appropriate response time to the functioning of the cruise control 40. The cruise control 40 may also receive quantitative loading information (e.g., an estimate of the load weight), and the cruise control 40 may then calculate a proper response time based on the load and apply the calculated response time. As another example, in one embodiment, the cruise control 40 may utilize different response times for different selected ground speeds or ranges of ground speeds. One example of such a configuration may use different response times for different set speeds, such as:

<7.5 mph: 1.9 seconds;
7.5-12.5 mph: 2.0 seconds;
12.5-17.5 mph: 3.5 seconds; and
>17.5 mph: 4.0 seconds.

As a further example, the cruise control 40 may factor both the load condition and the selected ground speed in determining and/or applying the proper response time. Other examples and embodiments are contemplated as well.

The cruise control 40 may be provided as a separate, dedicated module in one embodiment, or may be embodied by software and/or hardware within another control module, such as the vehicle controller 30, in another embodiment. The cruise control 40 may be controlled by the user in a number of different operations, including switching the system on/off, setting a desired travel speed, increasing or decreasing the set speed, deactivating or reactivating the constant travel speed setting, etc. The cruise control 40 may be configured so that the controls are accessible from the operator cab 14 and/or from the exterior of the vehicle 10. For example, the cruise control 40 may be configured to be controlled through the user interface 50 or a separate control input within the operator cab 14. As another example, the cruise control 40 may additionally or alternately be configured to be controlled through an interface on the exterior of the operator cab 14 and/or the exterior of the vehicle 10, such as an interface 51 in an operator area 52 that may be provided on the body 16, as shown in FIG. 2. The interface(s) for controlling the cruise control 40 may include electronic components, mechanical components, or both, and may be configured for receiving user/operator input for controlling the cruise control system 40. The cruise control 40 may send and receive messages over the internal databus network 35 of the vehicle 10.

FIG. 3 illustrates a block diagram of a computer device or computer system 101 that may be used for any computer component described herein, including the vehicle controller 30, the cruise control 40, and any other controllers. It is understood that FIG. 3 illustrates the computer system 101 as being connected to the vehicle controller 30, although the vehicle controller 30 may be embodied by, or may be part of, a computer system 101 as shown in FIG. 3. As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more tangible and/or non-transitory computer-readable storage media having computer-readable program code, or instructions, embodied in or on the storage media. Any suitable tangible and/or non-transitory computer readable storage media may be utilized, including hard disks, CD-ROMs, optical storage devices, magnetic storage devices, and/or any combination thereof. In addition, various intangible signals representing data or events as described herein may be transferred between a source and a destination in the form of electromagnetic waves traveling through signal-conducting media such as conductive (e.g. metal) wires, optical fibers, and/or wireless transmission media (e.g., air and/or space).

The computer system 101 may have a processor 103 for controlling overall operation of the computer system 101 and its associated components, including RAM 105, ROM 107, input/output module 109, and memory 115. I/O 109 may include a user input device through which a user of computer system 101 may provide input, such as a microphone, keypad, touch screen, other types of buttons, mouse, and/or stylus, and may also include one or more of a speaker for providing audio output and a video display device for providing textual, audiovisual and/or graphical output. The I/O 109 may also include equipment for collecting other forms of information or input, such as a device for collecting biometric input and/or audio input, a barcode reader or other device for collecting graphic input, or other type of input device. In one embodiment, the I/O may be at least partially embodied by a dashboard user interface 50 that provides both input and output interfaces for the user, as illustrated in FIGS. 3-4 and described in greater detail herein.

Software may be stored within memory 115 and/or other storage to provide instructions to processor 103 for enabling the computer system 101 to perform various functions, including functions relating to the methods described herein. For example, memory 115 may store software used by the computer system 101, such as an operating system 117, application programs 119, and an associated database 121. Alternatively, some or all of the computer executable instructions may be embodied in hardware or firmware (not shown). As described in detail below, the database 121 may provide centralized storage of vehicle information. It is understood that the memory 115 may store vehicle information that is not in database format, and that the memory 115 may include temporary and/or permanent memory. It is also understood that a computer system 101, single processor 103, and single memory 115 are shown and described for sake of simplicity, and that the computer system 101, processor 103, and memory 115 may include a plurality of computer devices or systems, processors, and memories respectively, and may comprise a system of computer devices, processors, and/or memories.

The computer system 101 may be configured to operate in a networked environment supporting connections to one or more other computer devices 141. Such other computer devices 141 may include any of the components and features of the computer system 101 described herein and illustrated in FIG. 3, as well as other features. The other devices 141 may be any suitable type of computer device, such as personal computers, servers, mobile devices, and any other conceivable type of computer component or device, that include many or all of the elements described above relative to the computer system 101. The device 101 may include various network connections for connection to the other devices 141, such as a wide area network (WAN), a local area network (LAN), a cellular/mobile network, and other communication paths. One or more communications interfaces 127 generally provide connections to these various networks. When used in a LAN networking environment, the computer system 101 is connected to the LAN through a network interface or adapter. When used in a WAN networking environment, the computer system 101 may include a modem for establishing communications over the WAN, and may also include transceivers for Wi-Fi, Bluetooth, infrared or other optical communication, near field communication (NFC), among other means. Connection to a cellular/mobile network may be provided, for example, by a GSM/TDMA service provider. The other communication paths mentioned can include direct communication, such as by Bluetooth or Wi-Fi. Use of a WAN can provide connection to the Internet 128, and it is understood that other communication paths, such as cellular/mobile network can also provide Internet connectivity. It is understood that the computer system 101 can connect to one or more of the other devices 141 through more than one of such networks. It will be appreciated that the network connections shown are exemplary and other means of establishing a communications link between the computers may be used. The existence of any of various well-known protocols is presumed. Additionally, an application program 119 used by the computer system 101 according to an illustrative embodiment may include computer executable instructions for invoking user functionality related to various communication techniques.

The computer system 101 may be configured for communication with the vehicle control system through the interface 127 as well. As shown in FIG. 3, the computer system 101 is configured for communication with various vehicle components, including the various controllers (e.g., 30, 40) of the vehicle control system, as well as the vehicle instrumentation 37, the user interface 50, and other components of the vehicle 10. It is understood that the computer system 101 may be in communication with additional components and/or may not communicate with some of the illustrated components, in further embodiments. It is also understood that certain computer devices may not include all of the features depicted in FIG. 3. For example, in one embodiment, the cruise control 40 may not be configured for communication over the Internet 128, and may only be configured for communication to and from the various components of the vehicle, e.g., over the internal communication network 35. In another embodiment, the cruise control 40 may be configured for communication only with the speedometer 28 and the PTO throttle control 27.

As described above, aspects of the systems and methods described herein may be described in the general context of computer-executable instructions, such as program modules, being executed by a computer. Generally, program modules include routines, programs, objects, components, data structures, and the like, that perform particular tasks or implement particular abstract data types. Such a program module may be contained in a tangible and/or non-transitory computer-readable medium, as described above. The systems and methods described herein may also be practiced in distributed computing environments where tasks are performed by remote processing devices that are linked through a communications network. In a distributed computing environment, program modules may be located in the memory 115, which may include both local and remote computer storage media including memory storage devices. It is understood that connections and communications disclosed herein may be made by any type of wired or wireless connection or communication.

Figure 5:
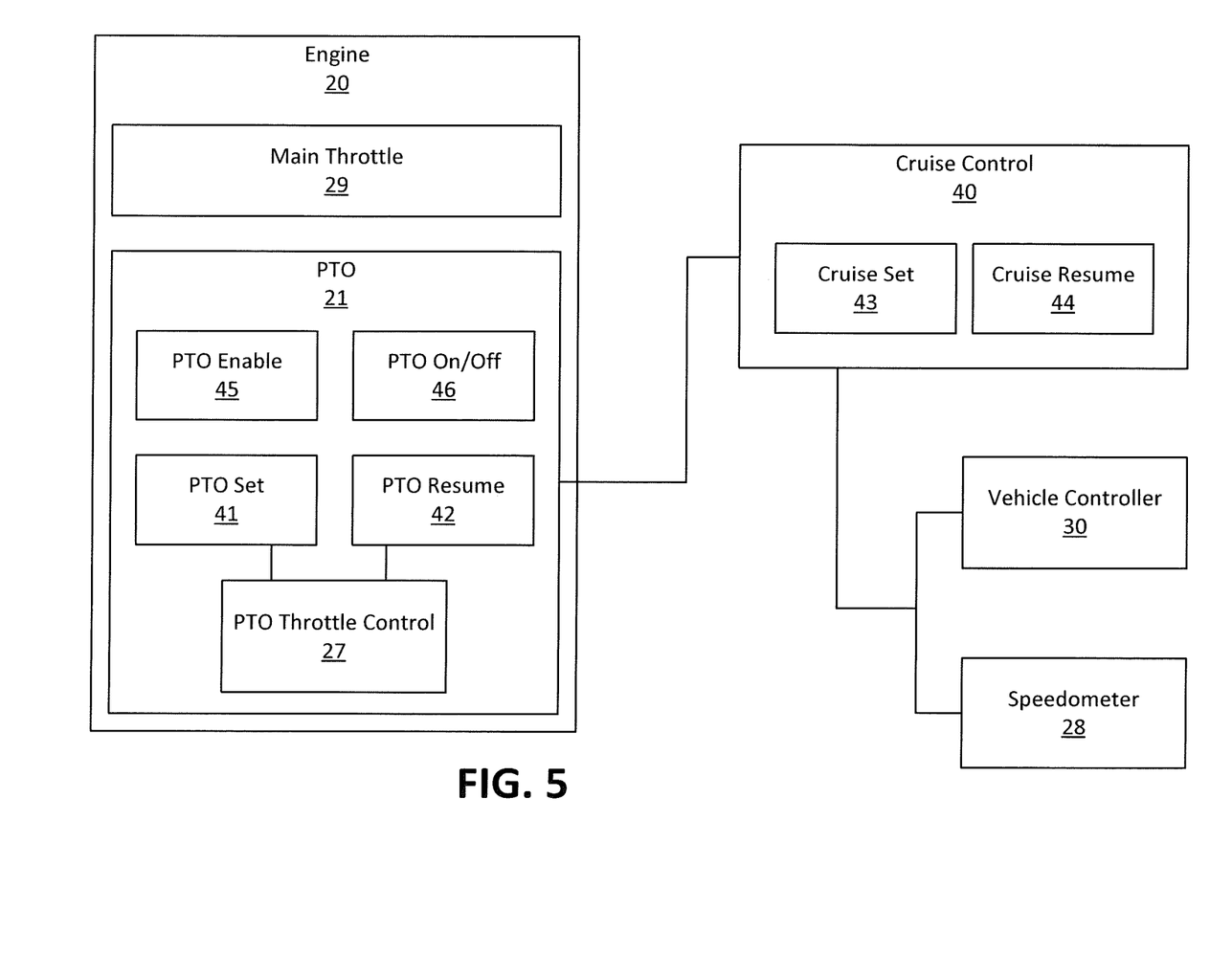
FIG. 5 is a schematic view of a cruise control and power take-off according to aspects of the present disclosure.

FIG. 5 illustrates an example embodiment of a cruise control 40 and a PTO 21. The cruise control 40 is connected to the vehicle controller 30, the speedometer 28, and the PTO 21 in this embodiment, and the PTO 21 may further include the PTO throttle control 27 and other controls. As described above, the PTO 21 is a component and function of the engine 20 in this embodiment. The controls of the PTO 21 include a PTO enable switch 45 and a PTO on/off switch 46, as well as a PTO set switch 41 and a PTO resume switch 42, which can be used to control the speed of the PTO 21 (and thereby the speed of the engine 20). The cruise control 40 includes a cruise control set switch 43 and a cruise control resume switch 44, which can be used to control the set speed of the cruise control 40 through the PTO 21. In one embodiment, the PTO function of the engine 20 is programmable, and when the PTO 21 is enabled (i.e., via the PTO enable switch 45), then the other switches such as the PTO on/off switch 45 and the PTO set and resume switches 41, 42 are activated and may be operated to turn the PTO 21 on or off and to increase or decrease the RPM of the engine 20. It is understood that the switches of the PTO can be operated by the cruise control 40, the vehicle controller 30, and/or other computer components. The PTO set and resume switches 41, 42 may alternately be programmed to different set speeds in one embodiment. For example, the PTO set switch 41 may be programmed to set the engine RPM to 1000, and the PTO resume switch 42 may be programmed to set the engine RPM to 1500. It is understood that any of the components in FIG. 5 may have additional switches and controls and/or may be interconnected to each other in different configurations.

Figure 6:
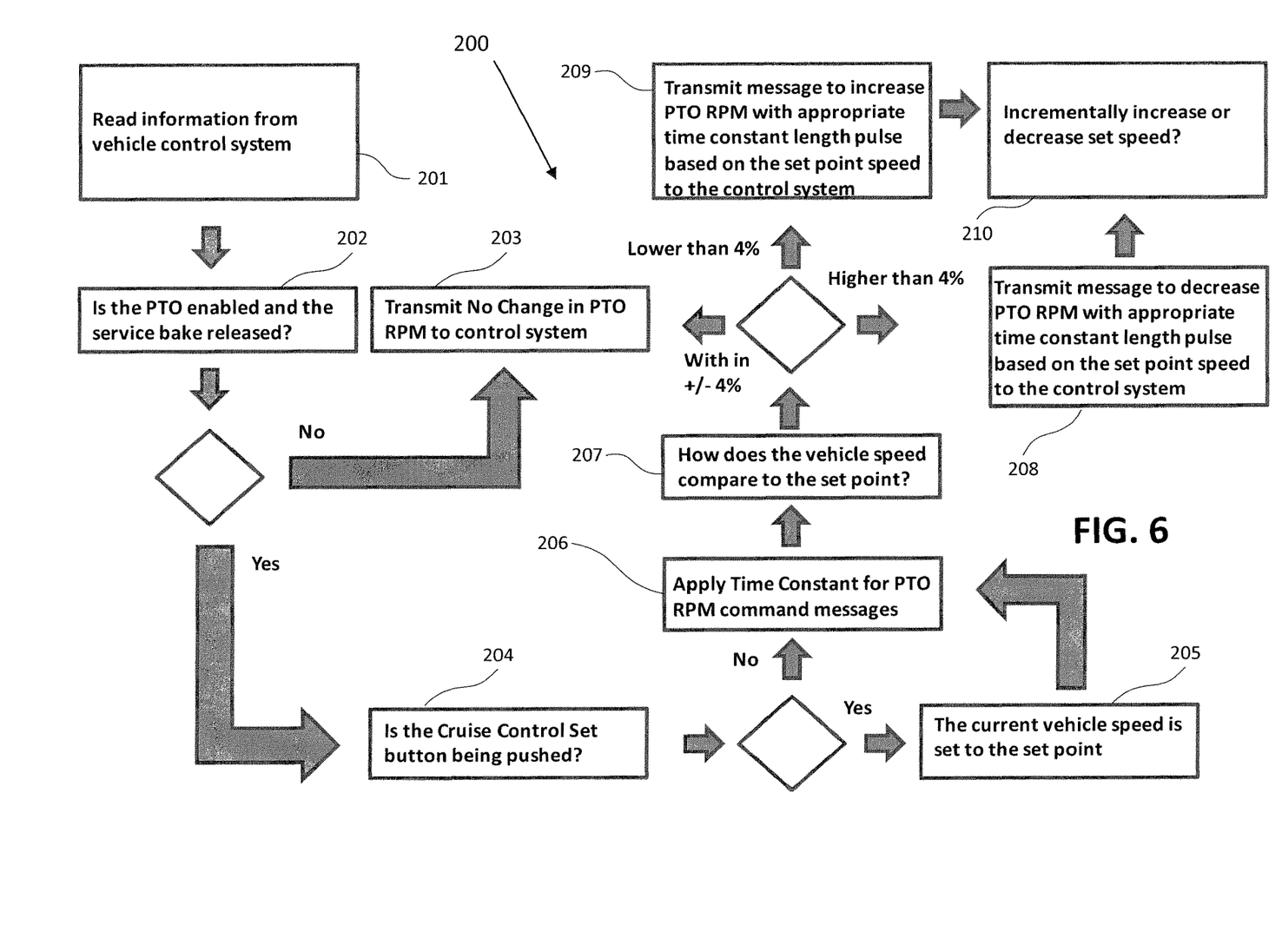
FIG. 6 is a flow diagram illustrating one embodiment of a method for operating a cruise control system according to aspects of the present disclosure.

FIG. 6 illustrates an example embodiment of a process 200 for operation of the cruise control system 40. As an initial matter, the cruise control 40 may be configured for reading various data from the vehicle control system, indicated at 201. Such data may include the vehicle speed, the status of the PTO set/resume switches 41, 42, the status of the cruise control set/resume switches 43, 44, whether the PTO 21 is enabled and/or turned on, whether the cruise control 40 is activated, the status of the main brake and the service brake, etc. The cruise control 40, once activated, makes an initial check to confirm that the PTO 21 is enabled and the service brake is released, at 202. If these conditions are not met, then the cruise control 40 maintains the current engine speed status, at 203. If the conditions are met, then the cruise control 40 can be set. In this embodiment, the cruise control 40 is set by the operator by pressing the set switch 43 to set the current vehicle speed as the set speed. The cruise control 40 detects whether the set switch 43 is being activated, at 204, and if so, then the set speed is set, at 205. If the set switch 43 is not activated, then the set speed is not changed. If a set speed was previously set, then that previous set speed is retained, and if no set speed was previously set, then the cruise control 40 does not operate to maintain a set speed. Assuming that a set speed is or was set, the process proceeds to maintaining the set speed. The appropriate response time (i.e., time constant) is determined and applied, at 206, and the cruise control 40 then compares the current speed to the set speed, at 207. If the threshold deviation (e.g., +/−4%) from the set speed is not exceeded, then the cruise control 40 maintains the current engine speed status, at 203. In this embodiment, the cruise control 40 accomplishes this function by transmitting a signal indicating no change in RPM to the PTO throttle control 27. If the current speed is greater than the threshold away from the set speed, then the cruise control 40 decreases the engine speed, e.g., by transmitting a signal to the PTO throttle control 27, at 208. If the current speed is lower than the threshold away from the set speed, then the cruise control 40 increases the engine speed, e.g., by transmitting a signal to the PTO throttle control 27, at 209. Steps 208 and 209 may incorporate the determined response time, such that the engine speed is not changed unless the threshold is exceeded for a time equal to the response time. The cruise control 40 may also determine a necessary "pulse time" to maintain the set speed, defined as a time period over which to increase or decrease the engine speed that is sufficient to return the vehicle speed to the set speed (or within the threshold from the set speed). The pulse time may be calculated in one embodiment based on one or more factors, such as the set speed, the loading of the vehicle, the degree of deviation from the set speed, etc. In another embodiment, the cruise control 40 may use a standard or user-defined pulse time. The signal transmitted to the PTO throttle control 27, at 208 or 209, may include a pulse time for increasing or decreasing the engine speed. The set speed may be incrementally changed during the process 200, at step 210, in addition to being reset at step 204. In one embodiment, the set speed may be increased or decreased by 1 mph by using the PTO set/resume switches 41, 42. The process 200 may then be repeated, and in one embodiment, the operation of the cruise control 40 may involve repeating this process 200 in a loop. It is understood that in other embodiments, steps may be added, eliminated, or processed in a different order.

The embodiments of the cruise control system described herein provide benefits and advantages over existing designs. For example, the cruise control provides a vehicle with a mechanism for accurately maintaining a desired speed at speeds (e.g., working speeds) that are lower than typical highway travelling speeds, such as ≤20 mph or ≤30 mph. The set ground speed can be maintained even when traversing an incline or decline. This can be particularly advantageous in certain working applications where a low, constant ground speed is desired. A paint striping truck is one type of vehicle that may benefit from this configuration, as even small variations in speed may result in unacceptable variations in paint application and consistency. As another example, the use of variable response times further assists the cruise control 40 in accurately maintaining desired speeds. As further examples, as stated above, use of the PTO throttle control 27 in connection with the cruise control 40 is less complicated than the use of the main engine throttle, and there are switches and/or programmable controls already available that can be used for this purpose. Lower cost may result from this increased simplicity and ease of use. As yet another example, the PTO 21 is already configured for use at low speeds, and the controls of the PTO 21 can be used automatically from the engine. Still other benefits and advantages are explicitly or implicitly described herein and/or recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Relative terms such as "first," "second," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention, and the scope of protection is only limited by the scope of the accompanying Claims.

What is claimed is:

1. A cruise control system for a truck having an engine and a main throttle capable of controlling a speed of the engine, the system comprising:

a cruise control device in communication with a speedometer of the truck and a power take-off throttle control capable of overriding the main throttle control for controlling a speed of the engine, the power take-off throttle control comprising a switch configured to control the speed of the engine at a set RPM, wherein the cruise control device comprises a processor configured for:
  receiving a user selection of a set ground speed of 20 mph or less;
  determining a current ground speed of the truck, via communication with the speedometer;
  comparing the current ground speed with the set ground speed; and
  taking further action based on the comparison between the current ground speed and the set ground speed, in order to maintain the current ground speed close to the set ground speed, comprising:
    transmitting an acceleration signal to the power take-off throttle control to increase the speed of the engine by increasing the set RPM if the current ground speed is determined to be lower than the set ground speed; and
    transmitting a deceleration signal to the power take-off throttle control to decrease the speed of the engine by decreasing the set RPM if the current ground speed is determined to be higher than the set ground speed.

2. The cruise control system of claim 1, wherein the processor of the cruise control device is configured for utilizing a threshold in determining whether the current ground speed is higher or lower than the set ground speed.

3. The cruise control system of claim 2, wherein the threshold is a percentage of the set ground speed.

4. The cruise control system of claim 1, wherein the processor of the cruise control device is further configured for determining a pulse time of the power take-off throttle control for increasing or decreasing the engine speed to maintain the set ground speed, and wherein the acceleration signal or the deceleration signal transmitted to the power take-off throttle control includes the pulse time.

5. The cruise control system of claim 4, wherein the pulse time is determined at least partially based on one or more factors selected from a group consisting of the set ground speed, a loading of the truck, and a degree of deviation from the set ground speed.

6. The cruise control system of claim 1, wherein the processor of the cruise control device is further configured for utilizing a response time, such that the processor is configured for transmitting the acceleration signal or the deceleration signal to the power take-off throttle control to increase or decrease a speed of the engine if the current ground speed is determined to be lower or higher than the set ground speed for a time exceeding the response time.

7. The cruise control system of claim 6, wherein the processor of the cruise control device is further configured such that the response time varies based on operating conditions of the truck.

8. The cruise control system of claim 7, wherein the operating conditions of the vehicle include at least one of a loading condition of the truck and the set ground speed.

9. A cruise control system for a vehicle having an engine and a power take-off throttle control capable of controlling the speed of the engine, comprising:
a cruise control device in communication with a speedometer of the vehicle and the power take-off throttle control, wherein the cruise control device comprises a processor configured for:
  receiving a user selection of a set ground speed;
  determining a current ground speed of the vehicle, via communication with the speedometer;
  comparing the current ground speed with the set ground speed; and
  taking further action based on the comparison between the current ground speed and the set ground speed, in order to maintain the current ground speed close to the set ground speed, comprising:
    transmitting an acceleration signal to the power take-off throttle control to increase a speed of the engine if the current ground speed is determined to be lower than the set ground speed; and
    transmitting a deceleration signal to the power take-off throttle control to decrease the speed of the engine if the current ground speed is determined to be higher than the set ground speed,
wherein the processor of the cruise control device is further configured for utilizing a response time, such that the processor is configured for transmitting the acceleration signal or the deceleration signal to the power take-off throttle control to increase or decrease a speed of the engine if the current ground speed is determined to be lower or higher than the set ground speed for a time exceeding the response time,
wherein the processor of the cruise control device is further configured such that the response time varies based on operating conditions of the vehicle, and
wherein the processor of the cruise control device is further configured for calculating the response time based on the operating conditions of the vehicle.

10. A truck comprising:
a truck chassis supported by a plurality of wheels;
an engine operably coupled to supply power to at least one of the wheels, the engine having a main throttle configured to be controlled by the operator to control a speed of the engine and a power take-off throttle control capable of overriding the main throttle control for controlling the speed of the engine, wherein the power take-off throttle control comprises a switch configured to control the speed of the engine at a set RPM; and
a cruise control device in communication with a speedometer of the truck and the power take-off throttle control, wherein the cruise control device comprises a processor configured for:
  receiving a user selection of a set ground speed of 20 mph or less;
  determining a current ground speed of the truck, via communication with the speedometer;
  comparing the current ground speed with the set ground speed; and
  taking further action based on the comparison between the current ground speed and the set ground speed, in order to maintain the current ground speed close to the set ground speed, comprising:
    transmitting an acceleration signal to the power take-off throttle control to increase the speed of the engine by increasing the set RPM if the current ground speed is determined to be lower than the set ground speed; and
    transmitting a deceleration signal to the power take-off throttle control to decrease the speed of the engine by decreasing the set RPM if the current ground speed is determined to be higher than the set ground speed.

11. The truck of claim 10, wherein the power take-off throttle is further configured for overriding the main throttle of the engine when the cruise control is activated.

12. The truck of claim 10, wherein the processor of the cruise control device is configured for utilizing a threshold in determining whether the current ground speed is higher or lower than the set ground speed.

13. The truck of claim 12, wherein the threshold is a percentage of the set ground speed.

14. The truck of claim 10, wherein the processor of the cruise control device is further configured for determining a pulse time of the power take-off throttle control for increasing or decreasing the engine speed to maintain the set ground speed, and wherein the acceleration signal or the deceleration signal transmitted to the power take-off throttle control includes the pulse time.

15. The truck of claim 14, wherein the pulse time is determined at least partially based on one or more factors selected from a group consisting of the set ground speed, a loading of the vehicle, and a degree of deviation from the set ground speed.

16. The truck of claim 10, wherein the processor of the cruise control device is further configured for utilizing a response time, such that the processor is configured for transmitting the acceleration signal or the deceleration signal to the power take-off throttle control to increase or decrease a speed of the engine if the current ground speed is determined to be lower or higher than the set ground speed for a time exceeding the response time.

17. The truck of claim 16, wherein the processor of the cruise control device is further configured such that the response time varies based on operating conditions of the vehicle.

18. The truck of claim 17, wherein the operating conditions of the vehicle include at least one of a loading condition of the vehicle and the set ground speed.

19. The truck of claim 10, wherein the truck further comprises an operator cab and an interface within the operator cab configured to receive user input for controlling the cruise control system.

20. The truck of claim 10, wherein the truck further comprises:
an operator cab supported by the chassis;
a body supported by the chassis and having an operator area thereon, located outside the operator cab of the truck; and
an interface accessible from the operator area of the body and configured to receive user input for controlling the cruise control system.

21. A vehicle comprising:
a chassis supported by a plurality of wheels;
an engine operably coupled to supply power to at least one of the wheels, the engine having a main throttle configured to be controlled by the operator to control the speed of the engine;
a power take-off throttle control configured for controlling the speed of the engine; and
a cruise control device in communication with a speedometer of the vehicle and the power take-off throttle control, wherein the cruise control device comprises a processor configured for:
receiving a user selection of a set ground speed;
determining a current ground speed of the vehicle, via communication with the speedometer;
comparing the current ground speed with the set ground speed; and
taking further action based on the comparison between the current ground speed and the set ground speed, in order to maintain the current ground speed close to the set ground speed, comprising:
transmitting an acceleration signal to the power take-off throttle control to increase a speed of the engine if the current ground speed is determined to be lower than the set ground speed; and
transmitting a deceleration signal to the power take-off throttle control to decrease the speed of the engine if the current ground speed is determined to be higher than the set ground speed,
wherein the processor of the cruise control device is further configured for utilizing a response time, such that the processor is configured for transmitting the acceleration signal or the deceleration signal to the power take-off throttle control to increase or decrease a speed of the engine if the current ground speed is determined to be lower or higher than the set ground speed for a time exceeding the response time,
wherein the processor of the cruise control device is further configured such that the response time varies based on operating conditions of the vehicle, and
wherein the processor of the cruise control device is further configured for calculating the response time based on the operating conditions of the vehicle.

22. A truck comprising:
a truck chassis supported by a plurality of wheels;
an engine operably coupled to supply power to at least one of the wheels, the engine having a main throttle configured to be controlled by the operator to control a speed of the engine and a power take-off throttle control capable of overriding the main throttle control for controlling the speed of the engine, wherein the power take-off throttle control comprises a switch configured to control the speed of the engine at a set RPM;
a cruise control device in communication with a speedometer of the truck and the power take-off throttle control, wherein the cruise control device comprises a processor configured for determining a current ground speed of the truck via communication with the speedometer and for transmitting instructions to the power take-off throttle control for maintaining the current ground speed of the truck close to a set ground speed of 20 mph or less selected by a user by increasing or decreasing the set RPM,
wherein the power take-off throttle control is configured for overriding the main throttle when the cruise control is activated.

23. A truck comprising:
a truck chassis supported by a plurality of wheels;
an operator cab supported by the chassis;
a body supported by the chassis and having an operator area thereon, located outside the operator cab of the truck, wherein the body is configured for a low-speed operation involving an operator positioned in the operator area;
an engine operably coupled to supply power to at least one of the wheels, the engine having a main throttle configured to be controlled by the operator to control the speed of the engine and a power take-off throttle control capable of overriding the main throttle control for controlling the speed of the engine, wherein the power take-off throttle control comprises a switch configured to control the speed of the engine at a set RPM;

a cruise control device in communication with a speedometer of the truck and the power take-off throttle control, wherein the cruise control device comprises a processor configured for transmitting instructions to the power take-off throttle control for maintaining a current ground speed of the truck close to a set ground speed selected by the operator that is 20 mph or less by increasing or decreasing the set RPM; and an interface accessible from the operator area of the body and configured to receive operator input for controlling the cruise control system.

* * * * *